United States Patent
Surjaatmadja et al.

(10) Patent No.: US 11,482,202 B2
(45) Date of Patent: Oct. 25, 2022

(54) ACOUSTIC NOISE REDUCTION AND ENERGY GENERATION BARRIER

(71) Applicant: Halliburton Energy Services, Inc., Houston, TX (US)

(72) Inventors: Jim Basuki Surjaatmadja, Duncan, OK (US); Timothy Holiman Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 525 days.

(21) Appl. No.: 16/484,672

(22) PCT Filed: May 24, 2017

(86) PCT No.: PCT/US2017/034300
§ 371 (c)(1),
(2) Date: Aug. 8, 2019

(87) PCT Pub. No.: WO2018/217199
PCT Pub. Date: Nov. 29, 2018

(65) Prior Publication Data
US 2020/0043457 A1   Feb. 6, 2020

(51) Int. Cl.
*G10K 11/172* (2006.01)
*G01V 1/44* (2006.01)

(52) U.S. Cl.
CPC ............ *G10K 11/172* (2013.01); *G01V 1/44* (2013.01); *G10K 2210/3044* (2013.01)

(58) Field of Classification Search
CPC . G10K 11/172; G10K 2210/3044; G01V 1/44
(Continued)

(56) References Cited

U.S. PATENT DOCUMENTS 5,231,337 A * 7/1993 van Namen ............... F04F 7/00
                                                                    310/15
5,828,768 A   10/1998 Eatwell et al.
(Continued)

FOREIGN PATENT DOCUMENTS

CN    202565460 U    11/2012
CN    203051012 U     7/2013
(Continued)

OTHER PUBLICATIONS

International Application No. PCT/US2017/034300, Written Opinion dated Feb. 21, 2018, 5 pages.
(Continued)

*Primary Examiner* — Forrest M Phillips
(74) *Attorney, Agent, or Firm* — Delizio, Peacock, Lewin & Guerra

(57) ABSTRACT

An apparatus comprises a circuitry and an acoustic-capture tile having a surface that is to face an acoustic source that is to emit a first acoustic wave having a first frequency and a second acoustic wave having a second frequency. The acoustic-capture tile comprises a first acoustic-capture subtile electrically coupled to the circuitry, the first acoustic-capture subtile to resonate at the first frequency, wherein the first acoustic-capture subtile is to capture the first acoustic wave and to convert the first acoustic wave into a first electric current in response to resonance at the first frequency. The acoustic-capture tile also comprises a second acoustic-capture subtile electrically coupled to the circuitry, the second acoustic-capture subtile to resonate at the second frequency, wherein the second acoustic-capture subtile is to capture the second acoustic wave and to convert the second acoustic wave into a second electric current in response to resonance at the second frequency.

18 Claims, 9 Drawing Sheets

(58) Field of Classification Search
USPC .......................................................... 181/175
See application file for complete search history.

(56) References Cited

U.S. PATENT DOCUMENTS

| | | | |
|---|---|---|---|
| 6,862,358 B1 | 3/2005 | Tabata | |
| 8,243,964 B2 | 8/2012 | Eaton | |
| 9,226,053 B2 | 12/2015 | Okamura et al. | |
| 9,359,997 B2* | 6/2016 | Toh | F03G 7/08 |
| 10,938,275 B2* | 3/2021 | Glatfelter | H01L 41/113 |
| 2006/0082158 A1* | 4/2006 | Schrader | F03G 7/002 |
| | | | 290/1 R |
| 2009/0200983 A1* | 8/2009 | Dyer | H02K 35/02 |
| | | | 320/107 |
| 2011/0233941 A1* | 9/2011 | Jee | H02K 7/1876 |
| | | | 290/1 R |
| 2015/0260171 A1* | 9/2015 | Toh | F03G 7/08 |
| | | | 290/52 |
| 2016/0197261 A1* | 7/2016 | Abdelkefi | H02N 2/188 |
| | | | 29/25.35 |

FOREIGN PATENT DOCUMENTS

| | | |
|---|---|---|
| DE | 202014000660 U1 | 3/2014 |
| GB | 547782 A | 9/1942 |
| JP | 2001197163 A | 7/2001 |
| KR | 20140125969 A | 10/2014 |
| KR | 101598413 B1 | 3/2016 |
| WO | 2006113777 A2 | 10/2006 |

OTHER PUBLICATIONS

International Application No. PCT/US2017/034300, Search Report dated Feb. 21, 2018, 3 pages.
Canadian Application Serial No. 3,052,769; Office Action; dated Jul. 2, 2020, 4 pages.

* cited by examiner

ACOUSTIC NOISE REDUCTION AND ENERGY GENERATION BARRIER

BACKGROUND

The disclosure generally relates to acoustics, and more particularly to acoustic noise reduction.

Noise pollution can be very hazardous to the environment, individuals, wildlife, etc. Examples of noise polluted operations or areas include downhole drilling for hydrocarbon production (e.g., pump operations, stimulation operations, cementing operations, etc.), jet testing laboratories, airport facilities, highways, etc.

BRIEF DESCRIPTION OF DRAWINGS

Embodiments of the disclosure can be better understood by referencing accompanying drawings.

DESCRIPTION

Figure 1:
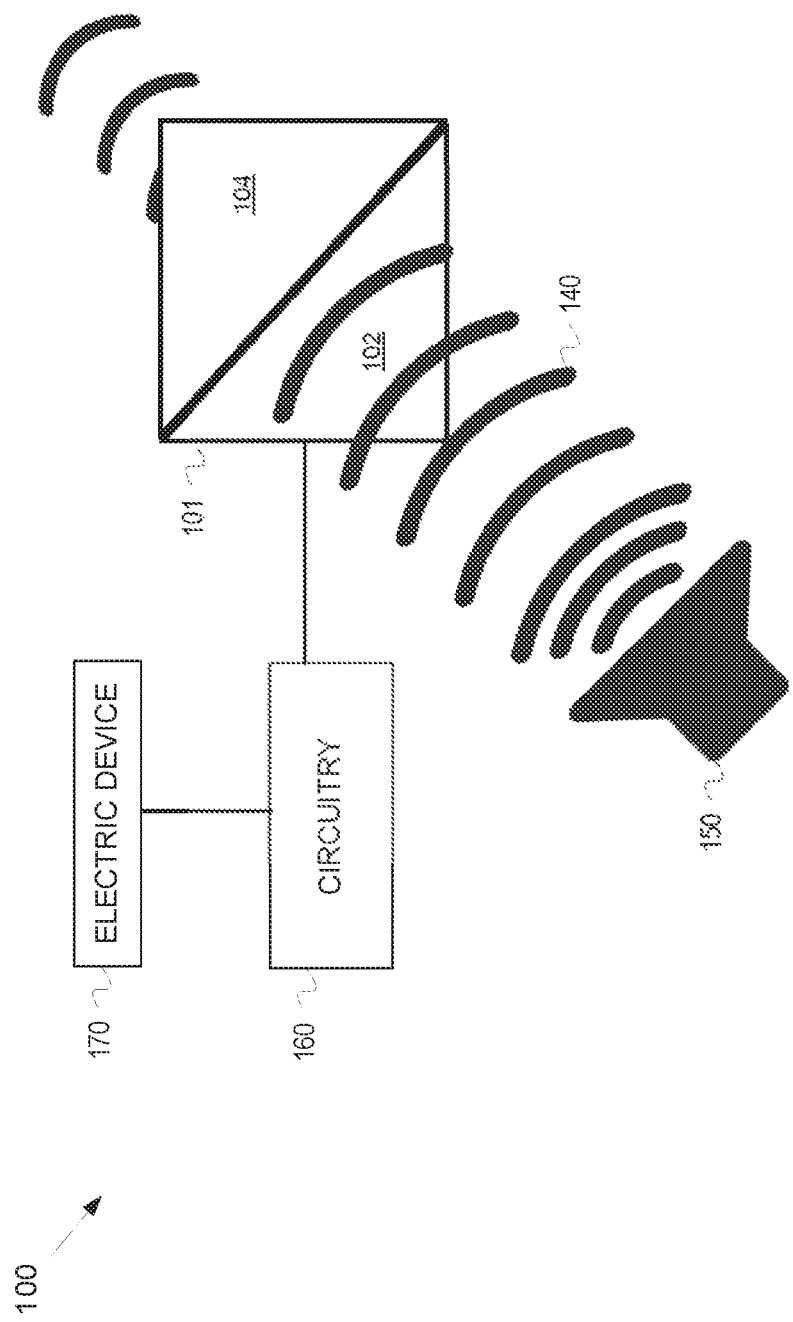
FIG. 1 depicts an example system for noise reduction, according to some embodiments.

The description that follows includes example apparatus, systems, and methods that comprises embodiments of the disclosure. However, it is understood that this disclosure can be practiced without these specific details. For instance, this disclosure refers to a resistor-inductor (RL) circuit in illustrative examples to shift the phase of an electric current. Embodiments of this disclosure can be also applied to a resistor-capacitor circuit or other more complex circuits that can also shift the phase of an electric current. In other instances, well-known instruction instances, protocols, structures and techniques have not been shown in detail in order not to obfuscate the description.

Various embodiments include a set of acoustic-capture subtiles that can capture acoustic waves and convert the acoustic waves to electric current. In some embodiments, an acoustic-capture subtile can include one or more piezoelectric materials. In some embodiments, an acoustic-capture subtile can include other electroacoustic transducers, such as magnetostrictive materials and electrostrictive materials. In some embodiments, an acoustic-capture subtile can be any type of a piezoelectric subtile that can convert acoustic waves into electric current when the acoustic wave is at a resonance frequency of the acoustic-capture piezoelectric subtile. A resonance frequency can be defined as a natural frequency of a piezoelectric subtile. The resonance frequencies of a piezoelectric subtile can be dependent on the shape, dimensions, composition, etc. of the piezoelectric subtile. Also, a piezoelectric subtile can have multiple resonance frequencies and can combine into a tiled arrangement to form an acoustic-capture tile that can transduce acoustic waves with different frequencies into electric current. In some embodiments, acoustic-capture tiles can be arranged to form the surface of an acoustic-capture wall.

Some subtiles can convert electric current into acoustic waves and are defined as acoustic-generator subtiles. In some embodiments, acoustic-generator subtiles are piezoelectric subtiles, and can combine into a tiled arrangement to form an acoustic-generator tile. Acoustic-generator tiles can be arranged to form the surface of an acoustic-generator wall.

Each acoustic-capture wall can be connected electronically with an acoustic-generator wall that is behind the acoustic-capture wall relative to a primary acoustic wave source. A primary acoustic wave source can be any source that generates acoustic waves that can be classified as noise. Examples of primary acoustic wave sources include high horsepower engines, construction sites, etc. An acoustic-reduction wall can mean either the acoustic-capture wall alone or the acoustic-capture wall in combination with the acoustic-generator wall. As further described below, the electric current generated by the acoustic-capture wall can be used to power the acoustic-generator wall to generate one or more phase-shifted acoustic waves to reduce the amplitudes of acoustic waves generated by the primary acoustic wave source. In some embodiments, the phase-shifted acoustic wave is emitted at the same frequency as the acoustic wave generated by the primary acoustic wave source, which can reduce the amplitudes of the acoustic waves from the primary acoustic wave source. In general, reducing the amplitude of a primary acoustic wave is equivalent to attenuating the primary acoustic wave and/or reducing noise from the primary acoustic wave source.

In some embodiments, the acoustic-capture subtiles can be constructed to capture a specific frequency or waveform of acoustic waves for conversion into an electric current, and can be arranged with different subtiles to form an acoustic-capture tile such that the tile can capture a targeted set of multiple acoustic waves. These acoustic-capture tiles can be used to construct a surface with no apertures, forming an acoustic-capture wall that can substantially attenuate a target range of acoustic waves that can be difficult for traditional barriers to attenuate.

Additionally, the acoustic-capture tiles can be used to power one or more acoustic-generator tiles that include acoustic-generator subtiles. The acoustic-generator subtiles can generate one or more acoustic waves that can substantially reduce a targeted range of acoustic waves. This arrangement can substantially further attenuate acoustic waves that can be difficult for traditional barriers to attenuate.

Example Systems

FIG. 1 depicts an example system for noise reduction, according to some embodiments. A system 100 includes an acoustic-capture tile 101 that is electrically coupled to circuitry 160. An electric device 170 is also electrically coupled to the circuitry 160. A primary acoustic wave source 150 generates primary acoustic waves 140 that are directed at the acoustic-capture tile 101. The primary acoustic waves 140 can be attenuated after penetrating the acoustic-capture tile 101. The acoustic-capture tile 101 includes two subtiles—an acoustic-capture subtile 102 and an acoustic-capture subtile 104. Both subtiles can be isosceles right triangles and are congruently arranged with each other to form the square area of the acoustic-capture capture tile 101. Each of the acoustic-capture subtiles 102 and 104 can capture the primary acoustic waves 140 and convert the primary acoustic waves 140 into electric currents with frequencies proportional to the frequencies of the acoustic waves being captured.

In some embodiments, an acoustic-capture tile can include any number of acoustic-capture subtiles in various shapes and compositions. Examples of acoustic-capture tiles and walls having different numbers and shapes of acoustic-capture subtiles are depicted in FIGS. 3-6, which are further described below. Different shapes, sizes, compositions, and constructions of the acoustic-capture subtiles can change the resonance frequencies and resonance waveforms of the acoustic-capture subtiles.

In some embodiments, two electric currents can be processed to form a combined current by matching the phase of the first electric current with the phase of the second electric current. The two electric currents are in-phase and can combine to double the current amplitude either at or before reaching the circuitry 160. The circuitry 160 can supply the electric current to an electric device 170 such as a resistor, voltmeter, light, fan, heating element, signal processing tool, energy storage device, etc. In some embodiments, subsets of the acoustic-capture subtiles can be electrically connected to separate circuitry, supplying different amounts of current to different circuitry. In some embodiments, the circuitry 160 can convert electric current into a direct current.

In some embodiments, the acoustic-capture subtiles can be different from each other, and each acoustic-capture subtile can generate an electric current with their own frequency. Use of different subtiles expands the number of acoustic waves that can be captured and allows tiles to be tailored to convert specific sets of acoustic waves into electric current. For example, the acoustic-capture subtile 102 can be thicker than the acoustic-capture subtile 104. The acoustic-capture subtile 102 can capture an acoustic wave with a lower frequency than the acoustic-capture subtile 104. The primary acoustic waves 140 can include a lower-frequency acoustic wave and a higher-frequency acoustic wave. The acoustic-capture subtile 102 can capture the lower-frequency acoustic wave from the primary acoustic waves 140. The acoustic-capture subtile 104 can capture the higher-frequency acoustic wave from the primary acoustic waves 140. For example, a high horsepower engine can be activated during a drilling operation. As a result, noise from the high horsepower engine can be emitted in the form of acoustic waves with a frequency of 20 Hertz (Hz). The high horsepower engine can supply mechanical energy to a cylinder. Noise from the cylinder can be emitted in the form of generates acoustic waves with a frequency of 100 Hz. The acoustic-capture subtile 102 can have a resonance frequency of 20 Hz and the acoustic-capture subtile 104 can have a resonance frequency of 100 Hz. The acoustic-capture subtile 102 can capture the acoustic waves with a frequency of 20 Hz and generate an electric current with a frequency of 20 Hz. The acoustic-capture subtile 104 can capture the acoustic waves with a frequency of 100 Hz and generate an electric current with a frequency of 100 Hz.

Figure 2:
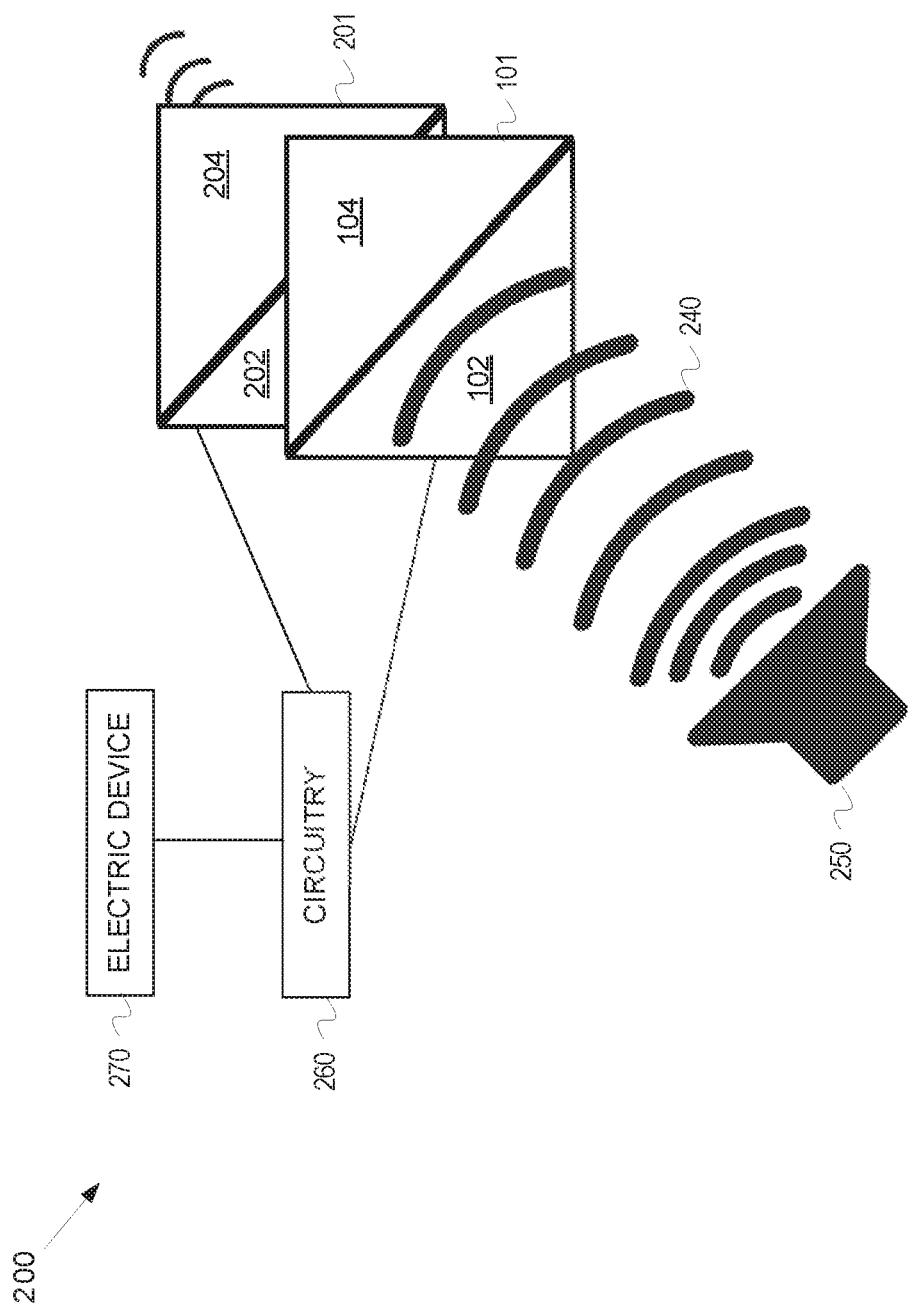
FIG. 2 depicts a different example system for noise reduction, according to some embodiments.

FIG. 2 depicts a different example system for noise reduction, according to some embodiments. In contrast to the system 100, a system 200 of FIG. 2 includes an acoustic-generator tile in addition to the acoustic-capture tile. The system 200 includes the acoustic-capture tile 101, which is electrically coupled to circuitry 260 and an acoustic-generator tile 201. The acoustic-generator tile 201 is electrically coupled to the circuitry 260. The circuitry 260 can also be electrically coupled to an electric device 270. The acoustic-generator tile 201 includes an acoustic-generator subtile 202 and an acoustic-generator subtile 204. A primary acoustic wave source 250 generates primary acoustic waves 240 that are directed at the acoustic-capture tile 101 and are substantially attenuated after penetrating the acoustic-generator tile 201. Each of acoustic-generator subtiles 202 and 204 can convert electric currents into acoustic waves.

Electric current supplied by acoustic-capture tiles can be transmitted to the circuitry 260 in order to power one or more electric devices and/or acoustic-generator tiles. In this example, the electric currents generated by the acoustic-capture subtiles 102 and 104 can be transmitted to the circuitry 260. The circuitry 260 can process the electric currents. In some embodiments, processing the electric currents can comprise using a phase-shifter to phase-shift (i.e. "shift the phase of") of each of the electric currents supplied by the acoustic-capture subtiles 102 and 104 by half a period of the electric currents to produce phase-shifted electric currents. For example, a phase-shifter can be a RL circuit integrated into the circuitry 260. In some embodiments, processing the electric currents can include amplifying the electric current with an amplifier included in the circuitry 260. For example, the electric currents can be amplified before being supplied to the acoustic-generator tiles 202 and 204. In some embodiments, the electric current supplied by the acoustic-capture subtiles 102 and 104 can be supplied to the electric device 270. For example, the electric currents can be converted into electric energy stored in a battery included in the electric device 270. Alternatively, or in addition, the circuitry 260 can supply the electric currents to the acoustic-generator subtiles 202 and 204.

In the case of supplying the electric currents to the acoustic-generator subtiles 202 and 204, the circuitry 260 can also phase-shift the electric currents and transmit the phase-shifted electric currents to the acoustic-generator subtiles 202 and 204. In this example, the acoustic-generator subtiles 202 and 204 can include a piezoelectric material. In some embodiments, the acoustic-generator subtiles 202 and 204 can include materials that are substantially identical in composition to the materials included in the acoustic-capture subtiles 102 and 104. Additionally, the acoustic-generator subtiles 202 and 204 can have shapes similar to the shapes of the acoustic-capture subtiles 102 and 104. In other examples, the acoustic-generator subtiles 202 and 204 can be different from the acoustic-capture subtiles 102 and 104. For example, the material and/or the shapes of the acoustic-generator subtiles 202 and 204 can be different from the acoustic-capture subtiles 102 and 104.

In some embodiments, the acoustic-generator subtiles 202 and 204 can include other electroacoustic transducers such as dynamic loudspeakers and magnetostrictive speakers. The acoustic-generator subtiles 202 and 204 can generate phase-shifted acoustic waves at the same frequency as the primary acoustic waves 240 when supplied with the phase-shifted electric currents. The phase-shifted acoustic waves can attenuate the primary acoustic waves 240 by interfering with the primary acoustic waves 240. In some embodiments, the phase-shifted acoustic wave is shifted by half a period of the primary acoustic waves 240 to increase this interference.

Example Tiles

FIGS. 3-6 are now described. FIGS. 3-6 depict different example tiles and walls suitable for both capturing and/or generating acoustic waves. For instance, any of the tiles depicted in FIGS. 3-6 can be used to substitute for the acoustic-capture tile 101 or acoustic-generator tile 201 depicted in FIGS. 1-2. Each subtile can include a piezoelectric component with a surface that is to face a primary acoustic wave source. Subtiles can be positioned together to form a closed surface with their nearest neighbors.

Figure 3:
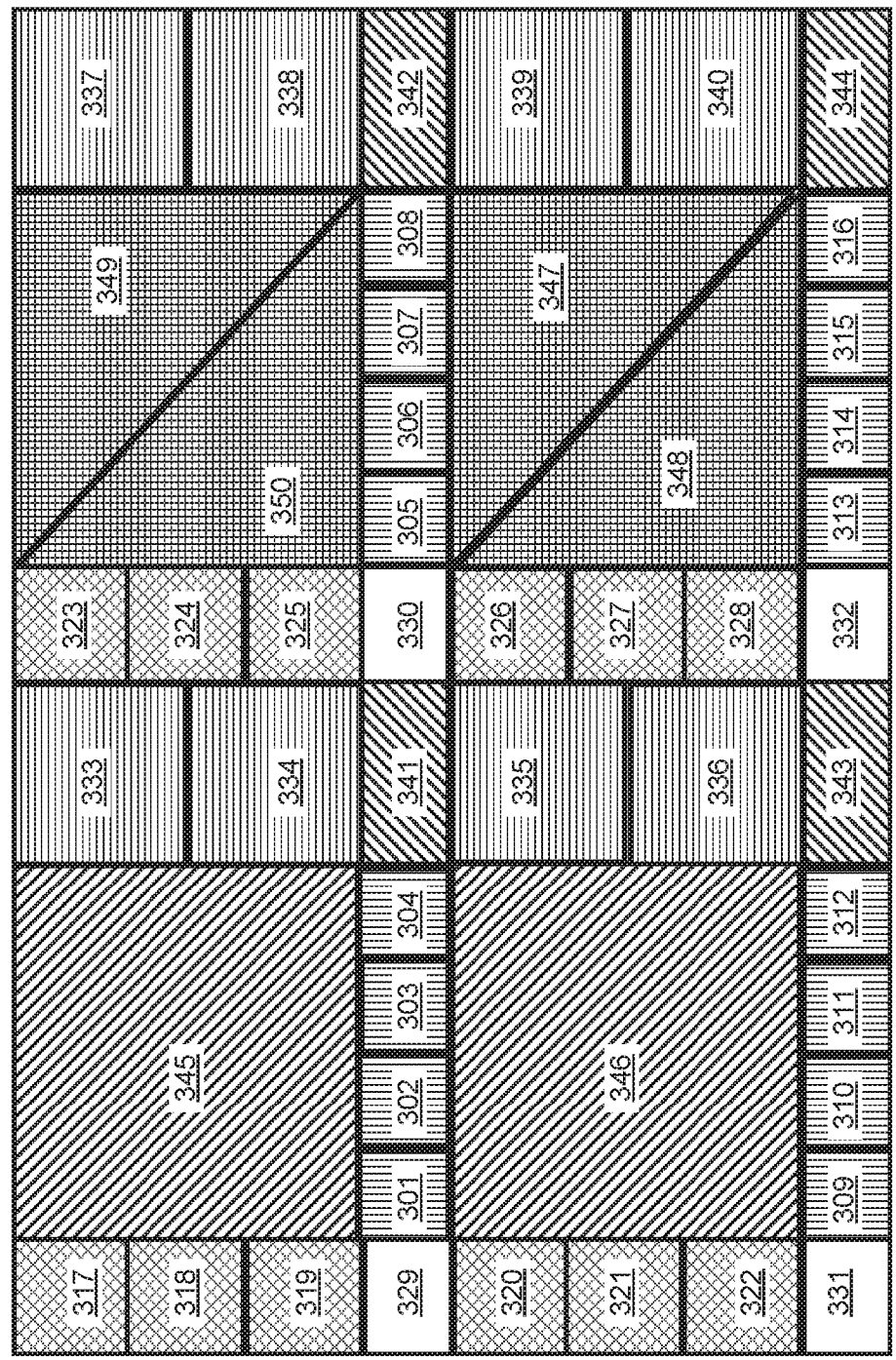
FIG. 3 depicts an example tile including seven sets of polygonal subtiles, according to some embodiments.

FIG. 3 depicts an example tile including seven sets of polygonal subtiles, according to some embodiments. A tile 300 is rectangular and includes seven sets of subtiles, wherein each subtile in a set has the same size and shape. In order of ascending sizes, the tile 300 includes the following sets of rectangular subtiles: a set of subtiles 301-316, a set of subtiles 317-328, a set of subtiles 329-332, a set of subtiles 341-344, a set of subtiles 333-340, and a set of subtiles 345-346. The tile 300 also includes a set of triangular subtiles 347-350. In some embodiments, each subtile can form a surface by being fixed to a shared rigid frame positioned behind the subtile. In other embodiments, the subtiles can form a tile surface by being connected to each other. For example, the subtiles can be connected together with adhesives at the borders of each subtile, fixed onto a shared planar surface behind the subtiles, mechanically joined with screws, and/or modified to fit in congruent shapes with each other in a way that prevents motion once fitted.

In this example, the tile 300 can be separated into four quadrants. Each quadrant encompasses a rectangular area between a corner of the tile 300 and the center of the tile 300. The four quadrants include the upper-left quadrant, upper-right quadrant, lower-right quadrant, and lower-left quadrant. In this example, each of the four quadrants are the same shape and size, and can differ in the internal arrangement of the subtiles included in the quadrant.

The upper-left quadrant includes the subtiles 301-304, 317-319, 329, 333-334, 341, and 345. The subtile 345 is positioned in the middle. The subtiles 317-319 are vertically arranged from top to bottom in ascending order into a left column adjacent to the left side of the subtile 345. The left column is equal in height to the subtile 345. The subtiles 301-304 are horizontally arranged from left to right in ascending order into a row adjacent to the bottom of the subtile 345. The row is equal in width to the subtile 345. The subtiles 333-334 are vertically arranged from top to bottom in ascending order into a right column adjacent to the right side of the subtile 345. The right column is equal in height to the subtile 345. The subtile 329 is equal in height to the subtile 301 and equal in width to the subtile 319. The subtile 329 is left of and adjacent to the subtile 301 and below and adjacent to the subtile 319. The subtile 341 is equal in height to the subtile 304 and equal in width to the subtile 334. The subtile 341 is right of and adjacent to the subtile 304 and below and adjacent to the subtile 334.

The lower-left quadrant is arranged similarly to the upper-left quadrant. The subtile 346 is adjacent to the lower side of the row including the subtiles 301-304. The lower-left quadrant includes the subtiles 309-312, 320-322, 331, 335-336, 343, and 346. The subtile 346 is positioned in the middle. The subtiles 320-322 are vertically arranged from top to bottom in ascending order into a left column adjacent to the left side of the subtile 346. The left column is equal in height to the subtile 346. The subtiles 309-312 are horizontally arranged from left to right in ascending order into a row adjacent to the bottom of the subtile 346. The row is equal in width to the subtile 346. The subtiles 335-336 are vertically arranged from top to bottom in ascending order into a right column adjacent to the right side of the subtile 346. The right column is equal in height to the subtile 346. The subtile 331 is equal in height to the subtile 309 and equal in width to the subtile 322. The subtile 331 is left of and adjacent to the subtile 309 and below and adjacent to the subtile 322. The subtile 343 is equal in height to the subtile 312 and equal in width to the subtile 336. The subtile 343 is right of and adjacent to the subtile 312 and below and adjacent to the subtile 336.

A lower-right square is right of the lower-right quadrant. The hypotenuse of the triangular subtile 347 is adjacent to the hypotenuse of the triangular subtile 348. The triangular subtile 347 and the triangular subtile 348 can combine to form the lower-right square. The lower-right quadrant is arranged similarly to the upper-left quadrant. The lower-right quadrant includes the subtiles 313-316, 326-328, 332, 339-340, 344, and 347-348. The lower-right square is positioned in the middle. The subtiles 326-328 are vertically arranged from top to bottom in ascending order into a left column adjacent to the left side of the lower-right square. The left column is equal in height to the lower-right square. The subtiles 313-316 are horizontally arranged from left to right in ascending order into a row adjacent to the bottom of the lower-right square. The row is equal in width to the lower-right square. The subtiles 339-340 are vertically arranged from top to bottom in ascending order into a right column adjacent to the right side of the lower-right square. The right column is equal in height to the lower-right square. The subtile 332 is equal in height to the subtile 313 and equal in width to the subtile 328. The subtile 332 is left of and adjacent to the subtile 313 and below and adjacent to the subtile 328. The subtile 344 is equal in height to the subtile 316 and equal in width to the subtile 340. The subtile 344 is right of and adjacent to the subtile 316 and below and adjacent to the subtile 340.

An upper-right square is above the lower-right quadrant. The hypotenuse of the triangular subtile 349 is adjacent to the hypotenuse of the triangular subtile 350. The triangular subtile 349 and the triangular subtile 350 can combine to form the upper-right square. The upper-right quadrant is arranged similarly to the lower-right quadrant. The upper-right quadrant includes the subtiles 305-308, 323-325, 330, 337-338, 342, and 349-350. The upper-right square is positioned in the middle. The subtiles 323-325 are vertically arranged from top to bottom in ascending order into a left column adjacent to the left side of the upper-right square. The left column is equal in height to the upper-right square. The subtiles 305-308 are horizontally arranged from left to right in ascending order into a row adjacent to the bottom of the upper-right square. The row is equal in width to the upper-right square. The subtiles 337-338 are vertically arranged from top to bottom in ascending order into a right column adjacent to the right side of the upper-right square. The right column is equal in height to the upper-right square. The subtile 330 is equal in height to the subtile 305 and equal in width to the subtile 325. The subtile 330 is left of and adjacent to the subtile 305 and below and adjacent to the subtile 325. The subtile 342 is equal in height to the subtile 308 and equal in width to the subtile 338. The subtile 342 is right of and adjacent to the subtile 308 and below and adjacent to the subtile 338. The row including the subtiles 305-308 is adjacent to the top of the triangular subtile 347.

The dimension and design of each of the subtiles in the sets of subtiles can change the frequencies and wave shapes that the subtiles capture and transduce into electric current. In general, larger subtiles capture lower resonance frequencies than smaller subtiles. For example, each of the subtiles 301-316 can capture acoustic waves with a frequency of 1000 Hz, while each of the subtiles 317-328 can capture acoustic waves with a frequency of 850 Hz. In this example, each of the subtiles 329-332 can capture acoustic waves with a frequency of 900 Hz, and each of the subtiles 333-340 can capture acoustic waves with a frequency of 600 Hz. Also, in this example, each of the subtiles 341-344 can capture acoustic waves with a frequency of 700 Hz, and each of the subtiles 345-346 can capture acoustic waves with a frequency of 500 Hz. Additionally, in this example, each of the triangular subtiles 347-350 can capture acoustic waves with a frequency of 550 Hz.

Subtiles with more angles and less symmetry can capture or create high-frequency acoustic waves. Depending on subtile shape, the energy efficiency of capturing and converting acoustic wave into an electric current can also change. In some embodiments, the angles of subtiles can provide the subtiles with additional, high-frequency resonance frequencies. For example, each of the subtiles 301-316 can capture acoustic waves with a frequency of 3000 Hz, while each of the subtiles 317-328 can capture acoustic waves with a frequency of 2850 Hz. In this example, each of the subtiles 329-332 can capture acoustic waves with a frequency of 2900 Hz, and each of the subtiles 333-340 can capture acoustic waves with a frequency of 2600 Hz. Also, in this example, each of the subtiles 341-344 can capture acoustic waves with a frequency of 2700 Hz, and each of the subtiles 345-346 can capture acoustic waves with a frequency of 2500 Hz. Additionally, in this example, each of the triangular subtiles 347-350 can capture acoustic waves with a frequency of 2550 Hz. In some embodiments, circular subtiles can be used in place of polygonal subtiles to capture primarily sinusoidal acoustic waves, whereas the rectangular and triangular subtiles can be superior in capturing acoustic waves that include multiple frequencies.

In some embodiments, the subtiles can be modified through changing their material composition by using piezoelectric crystals, piezoelectric ceramic materials, or piezoelectric polymers. In some embodiments, the subtiles can be modified by changing their sizes, varying the thickness across a subtile, making the subtiles hollow, changing the subtile surface to be concave or convex, or otherwise altering a subtile shape to increase the number of captured frequencies that can be used to generate electric currents. In some embodiments, each subtile included in a tile can be constructed to target a set of frequencies less than 1000 Hz. In such an arrangement, the tile captures a range of frequencies less than 1000 Hz.

Figure 4:
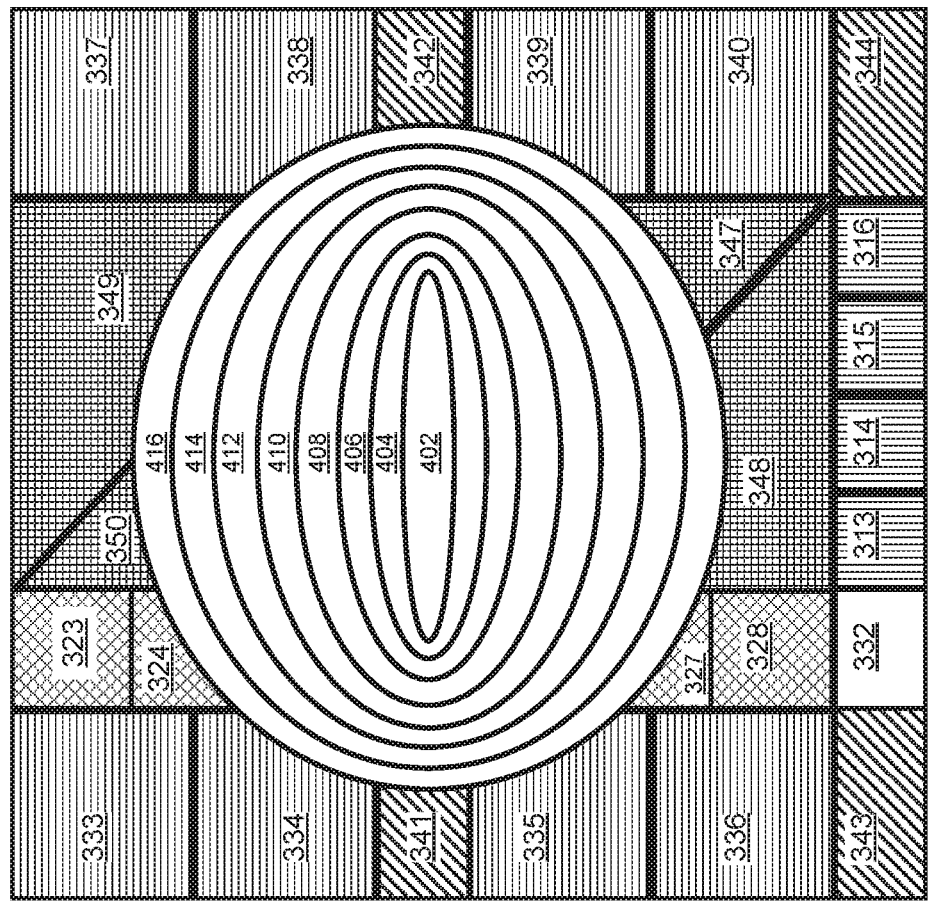
FIG. 4 depicts an example tile including six sets of polygonal subtiles and a set of concentric ellipsoid subtiles, according to some embodiments.

FIG. 4 depicts an example tile including six sets of polygonal subtiles and a set of concentric ellipsoid subtiles, according to some embodiments. FIG. 4 depicts a tile 400 with a set of ellipsoid subtiles 402-416 fixed in front of a number of the subtiles also depicted in FIG. 3. Each of the ellipsoid subtiles can be individually electrically connected to an acoustic-generator subtile, or connected to circuitry that generate a combined electric signal from each of the ellipsoid subtiles before transmission to an electric device or acoustic-generator tile.

In this example, the tile 400 includes an anterior rectangular tile. With reference to FIG. 3, the anterior rectangular tile includes the subtiles 313-316, 323-324, 327-328, 332, 341-344, 337-340, and 347-350, all arranged identically to FIG. 3 with respect to each other.

The tile 400 also includes the set of ellipsoid subtiles 402-416. In some embodiments, each of the ellipsoid subtiles are ellipsoid, concentric and positioned in front of the anterior rectangular tile. Each ellipsoid subtile is positioned from front to back in order of ascending size. The concentric arrangement of the ellipsoid subtiles can allow entire ranges of acoustic waves to be captured as they travel through the same approximate cross-sectional area. For example, the ellipsoid subtile 402 can capture acoustic waves with a frequency of 600 Hz, the ellipsoid subtile 404 can capture acoustic waves with a frequency of 550 Hz, the ellipsoid subtile 406 can capture acoustic waves with a frequency of 500 Hz, the ellipsoid subtile 408 can capture acoustic waves with a frequency of 450 Hz, the ellipsoid subtile 410 can capture acoustic waves with a frequency of 400 Hz, the ellipsoid subtile 412 can capture acoustic waves with a frequency of 346 Hz, the ellipsoid subtile 414 can capture acoustic waves with a frequency of 300 Hz, and the ellipsoid subtile 416 can capture acoustic waves with a frequency of 250 Hz. In such an arrangement, an acoustic wave with a frequency in the range of 600 Hz to 250 Hz can be substantially captured and converted to electric current. Moreover, any acoustic waves which can penetrate through the ellipsoid subtiles can still be captured by the subtiles underneath the ellipsoid subtiles.

Figure 5:
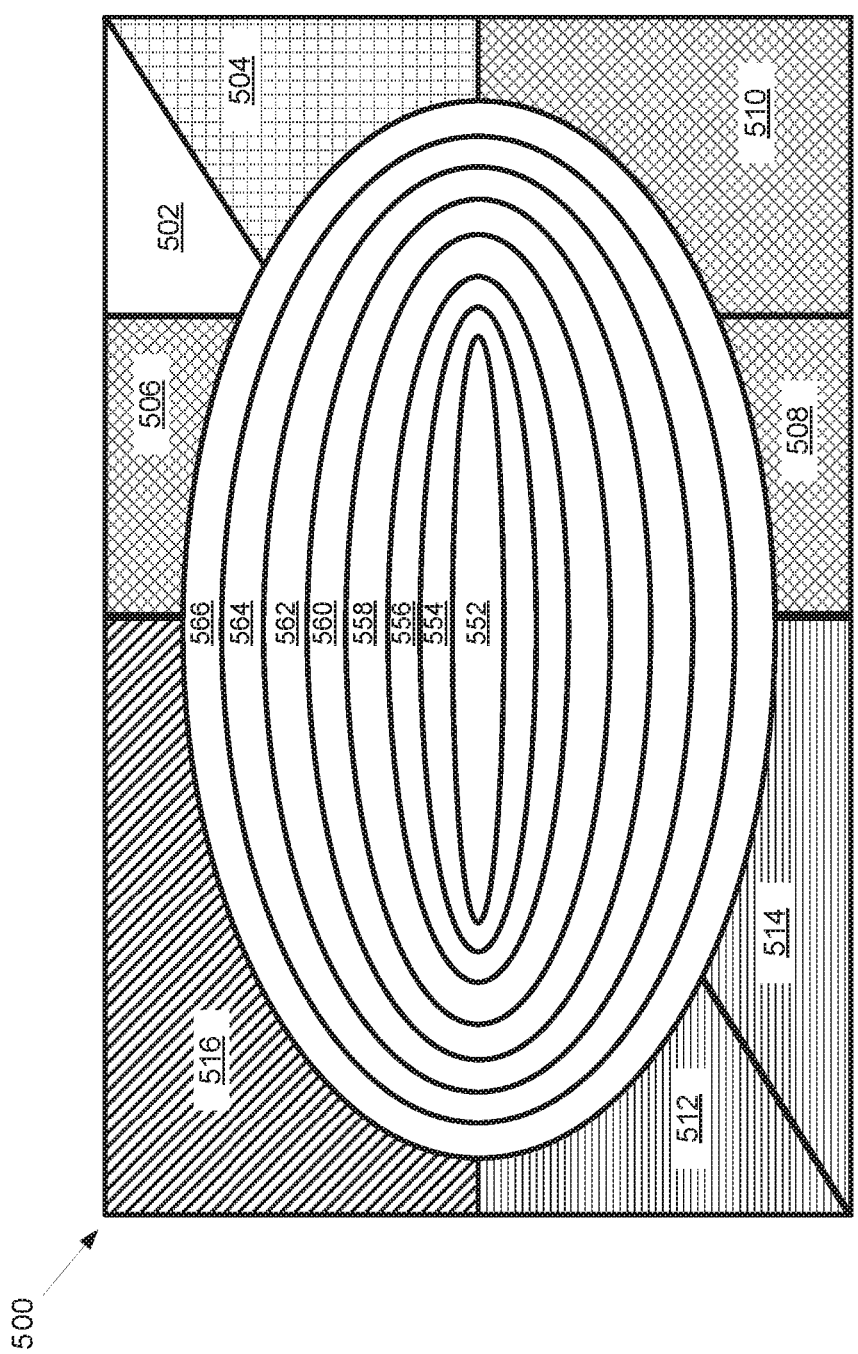
FIG. 5 depicts an example tile including four sets of polygonal subtiles and a set of concentric ellipsoid subtiles, according to some embodiments.

FIG. 5 depicts an example tile including four sets of polygonal subtiles and a set of concentric ellipsoid subtiles, according to some embodiments. FIG. 5 depicts a tile 500 and includes a set of ellipsoid subtiles 552-566 and an anterior rectangular tile including the set of subtiles 502-516.

The anterior rectangular tile includes a rectangular subtile 516. A triangular subtile 512 is shaped like a right triangle and has a height and length equal to the height and width of the rectangular subtile 516. The triangular subtile 512 is adjacent to the bottom of the rectangular subtile 516. A triangular subtile 514 is identical in shape to the triangular subtile 512. The triangular subtile 512 is adjacent to the triangular subtile 514 at their respective hypotenuses, and can form a rectangular area similar in shape to the rectangular subtile 516. A rectangular subtile 508 has a height equal to the triangular subtile 514 and length equal to half the width of the rectangular subtile 516. The rectangular subtile 508 is to the right of and adjacent to the triangular subtile 514. The rectangular subtile 510 is identical in shape to the rectangular subtile 508. The rectangular subtile 510 is adjacent to the rectangular subtile 508. The combined shape formed by the rectangular subtile 510 and the rectangular subtile 508 is a rectangular area that is similar in shape to the rectangular subtile 516.

The anterior rectangular tile also includes a rectangular subtile 506 that is identical in shape to the rectangular subtile 508. The rectangular subtile 506 is adjacent to the top to the rectangular subtile 508. A trapezoidal subtile 504 is adjacent to the top of the rectangular subtile 510, The trapezoidal subtile 504 is a right trapezoid with a longer height and width equal to the height and width of the rectangular subtile 510 and has a shorter height that is equal to half the length of the longer height. A triangular subtile 502 is a right triangle with a width equal to the width of the trapezoidal subtile 504 and a height equal in length to half of the height of the rectangular subtile 506. The triangular subtile 502 is arranged congruently with the trapezoidal subtile 504 to form an area equal to the area of the rectangular subtile 510. The combined shape formed by the triangular subtile 502, trapezoidal subtile 504, and rectangular subtile 510 is a rectangular area that is similar in shape to the rectangular subtile 516. With further reference to FIG. 4, the tile 500 also includes the ellipsoid subtiles 552-566 positioned in front the subtiles 502-516. In some embodiments, the ellipsoid subtiles 552-566 can be concentric and centered around the horizontal and vertical centers of the tile 500.

Due in part to their disparate shapes and sizes, the subtiles 502-516 can differ in resonance frequencies. The triangular subtile 502 can capture acoustic waves with a frequency of approximately 600 Hz, the trapezoidal subtile 504 can capture acoustic waves with a frequency of approximately 550 Hz, the rectangular subtiles 506-510 can capture acoustic waves with a frequency of approximately 500 Hz, the triangular subtiles 512-514 can capture acoustic waves with a frequency of approximately 490 Hz, and the rectangular subtile 516 can capture acoustic waves with a frequency of 450 Hz.

In some embodiments, the polygonal shapes can also provide a complex frequency signature. The complex frequency signature can be similar to a frequency signature from a primary acoustic wave source. In some embodiments, for subtiles having a polygonal shape, a frequency band of the frequency signature can be determined by the distance between opposing edges of the subtile. The absolute frequency of a subtile can be determined by the stiffness of the subtile, wherein increasing stiffness can increase the frequency of acoustic waves that can be captured by the subtile. For example, the rectangular subtile 508 can have a thickness of 1 cm and capture acoustic waves with frequencies of 250 Hz and 500 Hz. The rectangular subtile 510 can have a thickness of 4 cm and capture acoustic waves with frequencies of 1000 Hz and 2000 Hz.

Figure 6:
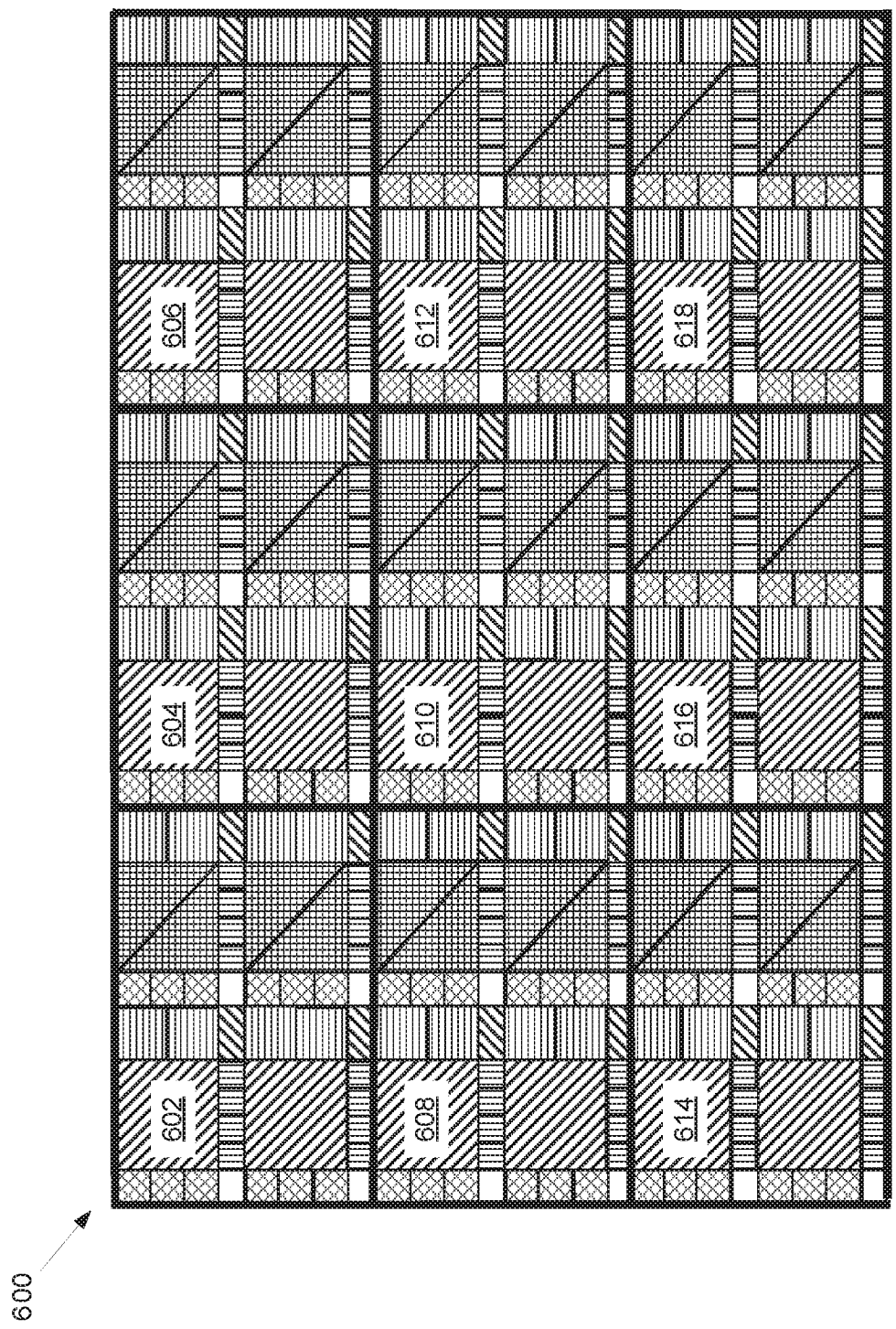
FIG. 6 depicts a wall including multiple tiles, according to some embodiments.

FIG. 6 depicts a wall including multiple tiles, according to some embodiments. With further reference to FIG. 3. FIG. 6 depicts a wall 600 including a 3×3 arrangement of tiles 602-618, each of which are identical to the tile 300. The tile 602 is in the upper left. The tile 604 is in the upper center and is adjacent to the right of the tile 602. The tile 606 is in the upper right and is adjacent to the right side of the tile 604. The tile 612 is in the middle right and is adjacent to the bottom of the tile 606. The tile 618 is in the lower right and is adjacent to the bottom of the tile 612. The tile 616 is in the lower center and is adjacent to the left side of the tile 618. The tile 612 is in the lower left and is adjacent to the left side of the tile 616. The tile 608 is in the middle left and is and is adjacent to the top of the tiles 602. The tile 610 is in the middle center and is adjacent to the bottom of the tile 604, adjacent to the right side of the tile 608, adjacent to the left side of the tile 612, and adjacent to the top of the tile 616.

By repeating the tile over the dimensions of the wall 600 without substantial empty space, a closed surface of the wall 600 can be formed. For example, with further reference to FIG. 3, acoustic waves with a frequency in a target range can be substantially attenuated as they encounter the wall 600, wherein the target range is determined by the resonance frequencies of the subtiles 301-350.

Though not shown, an identical acoustic-generator wall can be placed behind the wall 600. With further reference to FIG. 2, the circuitry 260 can phase-shift each of the electric currents produced by the subtiles in the wall 600 and transmit these phase-shifted electric currents to the identical acoustic-generator wall behind the wall 600. The acoustic-generator wall can then emit a set of phase-shifted acoustic waves that match the frequency of a primary acoustic wave and would further reduce the amplitude of one or more primary acoustic waves.

Example Noise Reduction Operations

Figure 7:
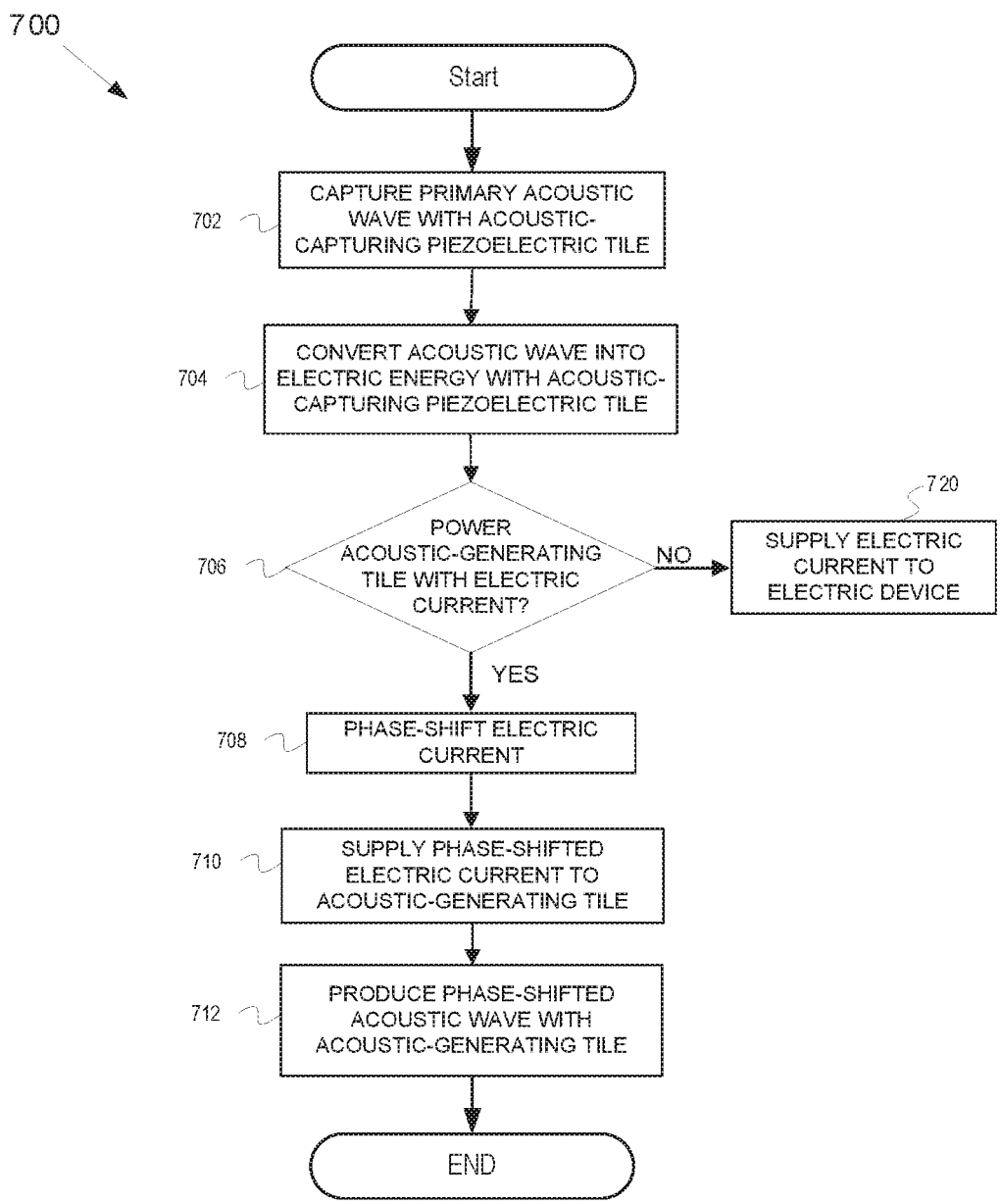
FIG. 7 depicts a flowchart of operations for noise reduction, according to some embodiments.

FIG. 7 depicts a flowchart of operations for noise reduction, according to some embodiments. The example operations are described with reference to the example system depicted in FIG. 2. Operations of a flowchart 700 begin at block 702.

At block 702, a primary acoustic wave is captured with an acoustic-capture tile. In some embodiments, a primary acoustic wave encounters an acoustic-capture tile and is attenuated as some of its acoustic energy is captured by the acoustic-capture tile. For example, with reference to FIG. 2, the primary acoustic wave source 250 generates the primary acoustic waves 240. The acoustic-capture tile 101 captures the primary acoustic waves 240 with frequencies substantially equal to the resonance frequencies of the acoustic-capture subtiles 102 and 104.

At block 704, the acoustic-capture subtile converts the acoustic wave into electric energy (e.g., electric current). In some embodiments, the acoustic-capture subtile can include a piezoelectric material. One of the properties of a piezoelectric material is to convert mechanical/acoustic energy into electric energy in a reversible way (e.g. a piezoelectric material can also convert electric energy into mechanical/acoustic energy). A subtile that includes a piezoelectric material can have this same property. In some embodiments, the electric current can be an alternating current with a current frequency proportional to the frequency of the primary acoustic wave. For example, with reference to FIG. 2, the acoustic-capture subtiles 102 and 104 can convert the primary acoustic waves 240 into electric energy. The acoustic-capture subtiles 102 and 104 can produce electric currents with current frequencies proportional to the frequencies of the primary acoustic waves 240.

For example, with reference to FIG. 2, the acoustic-capture subtiles 102 and 104 can have different resonance frequencies to capture different primary acoustic waves from a drilling operation. The primary acoustic waves 240 from the drilling operation can include a primary acoustic wave from a motor and a primary acoustic wave from a drill. The primary acoustic wave from the motor can have a frequency of 20 Hz. The primary acoustic wave from the drill can have a frequency of 100 Hz. The acoustic-capture subtile 102 can have a resonance frequency of 20 Hz and capture the primary acoustic wave from the motor. The acoustic-capture subtile 104 can have a resonance frequency of 100 Hz and capture the primary acoustic wave from the drill.

At block 706, a determination is made of whether the electric current is to power an acoustic-generator tile. This determination can be made by hardware, software, firmware, or a combination thereof. For example, with reference to FIG. 2, a switch in the circuitry 260 or software controlling the circuitry 260 can be configured to make this determination. The determination of whether to use the electric current to power one or more acoustic-generator tiles can be based on various criteria. For example, with reference to FIG. 2, the circuitry 260 can be determined to power a battery in the electric device 270 when the amplitude of the primary acoustic wave is less than a sound threshold. In the case when the amplitude of the acoustic wave is not less than a sound threshold, the circuitry 260 can be determined to power the acoustic-generator tile 201. In some embodiments, this sound threshold can be 10 decibels. In some embodiments, this sound threshold can be 50 decibels. In some embodiments, this sound threshold can be 100 decibels. If the electric currents are to power an acoustic-generator tile, operations of the flowchart 700 continue at block 708. Otherwise, operations of the flowchart 700 continue at block 720.

At block 708, the electric current is phase-shifted. The electric current is phase-shifted to be out of phase with the primary acoustic wave and converted to a phase-shifted electric current. For example, with reference to FIG. 2, the circuitry 260 can shift the phase of an electric current generated by the acoustic-capture subtile 102 by half a period of the electric current to produce a phase-shifted electric current. A phase-shifted electric current can power the acoustic-generator subtiles 202 and 204 to generate phase-shifted acoustic waves. The phase-shifted acoustic waves can interfere with the primary acoustic waves 240 in order to reduce the amplitude of the primary acoustic waves 240.

In some embodiments, the circuitry 260 can shift the phase of the electric current by an interval other than half a period. For example, with reference to FIG. 2, the circuitry 260 can shift the phase of the electric current generated by the acoustic-capture subtile 102 by a quarter of a period of the electric current produced by the acoustic-capture subtile 102. An electric current with a phase shifted by an interval other than half a period can generate phase-shifted acoustic waves with a phase shifted by an interval other than half a period. The phase-shifted acoustic waves can be used when the physical space between the acoustic-capture subtiles 102 and the acoustic-generator subtile 202 can also shift the phase between the phase-shifted acoustic waves and the primary acoustic waves 240. The combination of the phase-shift caused by the circuitry 260 and the phase-shift caused by the space between the acoustic-capture subtile 102 and the acoustic-generator subtile 202 can shift the phase of the phase-shifted acoustic waves by half a period relative to the primary acoustic waves 240.

In some embodiments, the circuitry 260 can supply the electric current to either an electric device or an acoustic-generator tile without shifting the phase at all. For example, with reference to FIG. 2, the circuitry 260 can supply the electric current generated by the acoustic-capture subtile 102 directly to the acoustic-generator subtile 202. A phase-shifted acoustic wave can be generated from the physical space between the acoustic-capture subtiles 102 and the acoustic-generator subtile 202. The space between the acoustic-capture subtiles 102 and the acoustic-generator subtile 202 can shift the phase of the phase-shifted acoustic waves by half a period relative to the primary acoustic waves 240.

At block 710, the phase-shifted current is supplied to an acoustic-generator tile. In some embodiments, a plurality of phase-shifted currents can be supplied to the acoustic-generator tile, wherein each of the phase-shifted currents is supplied to a different acoustic-generator subtile comprising the acoustic-generator tile. In some embodiments, one phase-shifted current is equally distributed to each of the acoustic-generator subtiles comprising the acoustic-generator tile. For example, with respect to FIG. 2, a phase-shifted electric current is transmitted from the circuitry 260 to the acoustic-generator tile 201 and equally distributed to the acoustic-generator subtiles 202 and 204.

In some embodiments, the phase-shifted electric current can be amplified by an amplifier. In some embodiments, the phase-shifted electric current can be supplemented by a battery. For example, with respect to FIG. 2, the electric device 270 can include a battery to store electric energy. The electric energy can be used to produce supplemental currents that are phase-shifted to be at the same phase as the phase-shifted electric current. In some embodiments, the supplemental currents can be selectively supplied only when the amplitude of the primary acoustic wave is not less than the sound threshold.

At block 712, the acoustic-generator tile produces a phase-shifted acoustic wave. The acoustic-generator tile can include one or more acoustic-generator subtiles. Each of the subtiles can generate an acoustic wave from an electric current. In some embodiments, the acoustic-generator subtiles are piezoelectric subtiles. In some embodiments, each of the acoustic-generator subtiles can generate different acoustic waves. In some embodiments, each of the acoustic-generator subtiles can generate the same acoustic waves. For example, with respect to FIG. 2, the acoustic-generator subtiles 202 and 204 can each produce phase-shifted acoustic waves with the same frequency as the primary acoustic waves 240, thereby reducing the amplitude of the primary acoustic waves 240. Accordingly, in some embodiments, the level of noise can be reduced by both the acoustic-capture subtiles and the acoustic-generator subtiles. In some embodiments, the acoustic-generator tile can be powered by the phase-shifted acoustic wave after the phase-shifted acoustic wave has been amplified by an amplifier. In some embodiments, the acoustic-generator tile can be powered by both the phase-shifted acoustic wave and a battery. For example, with respect to FIG. 2, the acoustic-generator tile 201 can be powered by both the phase-shifted electric currents that are converted from the acoustic-capture tile 101 and by supplemental currents supplied by the electric device 270.

At block 720, the electric current is supplied to an electric device. In some embodiments, the electric current can be used to power lighting devices, heating elements, or computer devices. In some embodiments, the electric current can be used to power a sensor that can detect noise or report excess acoustic wave amplitudes. For example, with reference to FIG. 2, the electric currents from the acoustic-capture subtiles 102 and 104 are sent to the electric device 270. In some embodiments, the electric currents generated by the acoustic-capture subtile 102 and 104 can be stored as electric energy in a battery included in the electric device 270. Operations of the flowchart 700 can return to block 702 to continue to capture and convert acoustic waves until the noise sources ceases producing noise, the noise reduction system is powered down, moved, etc. Operations of the flowchart 700 are complete.

The numbers that annotate FIG. 7 represent stages of operations. Although these stages are ordered for this example, the stages illustrate one example to aid in understanding this disclosure and should not be used to limit the claims. Subject matter falling within the scope of the claims can vary with respect to the order and some of the operations. Additional operations can be performed; fewer operations can be performed; the operations can be performed in parallel; and the operations can be performed in a different order. For example, the operations depicted in blocks 702 and 712 can be performed concurrently while the tile is exposed to acoustic waves.

Example Applications

Figure 8:
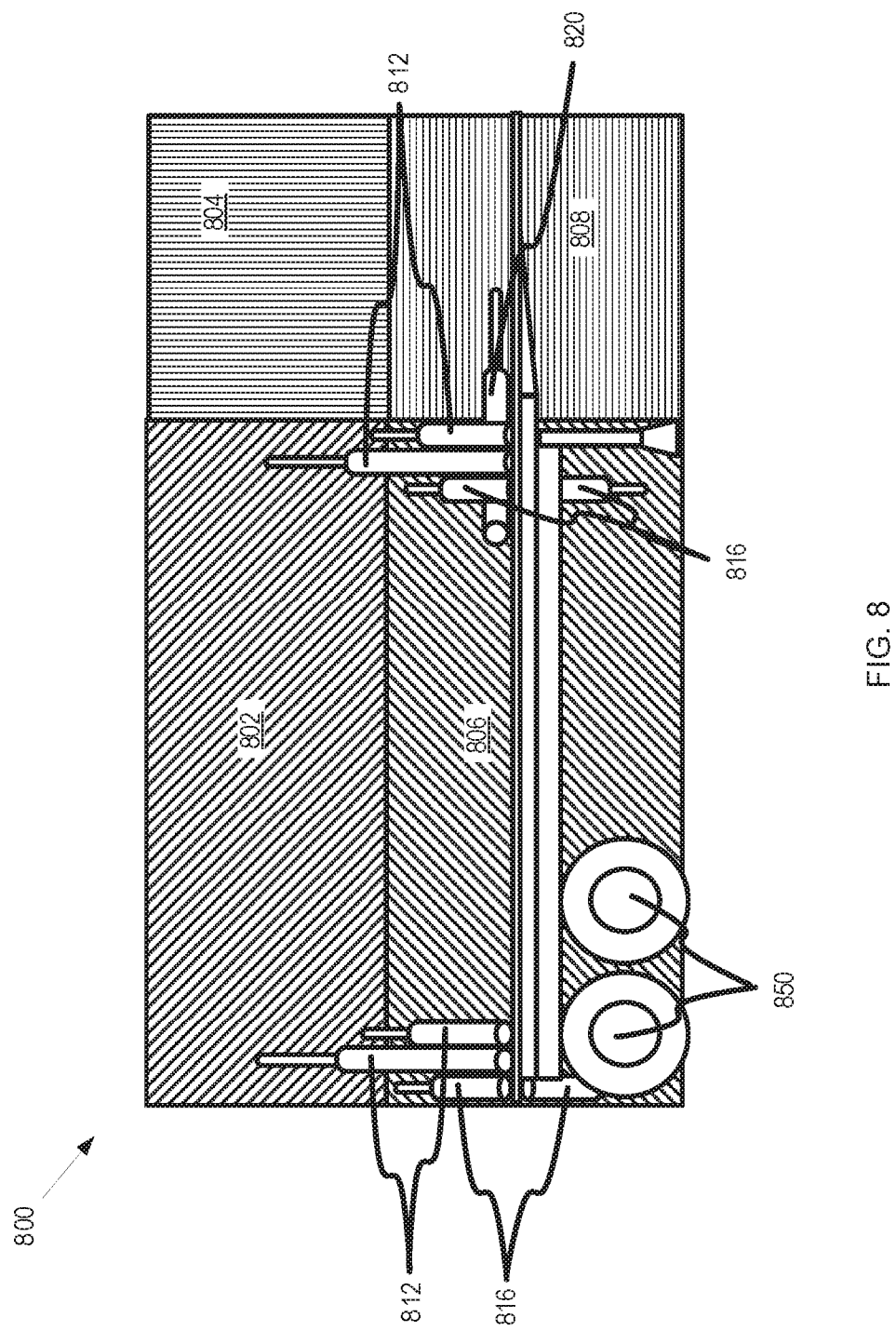
FIG. 8 depicts a rear view of acoustic-reduction walls attached to a trailer, according to some embodiments.
Figure 9:
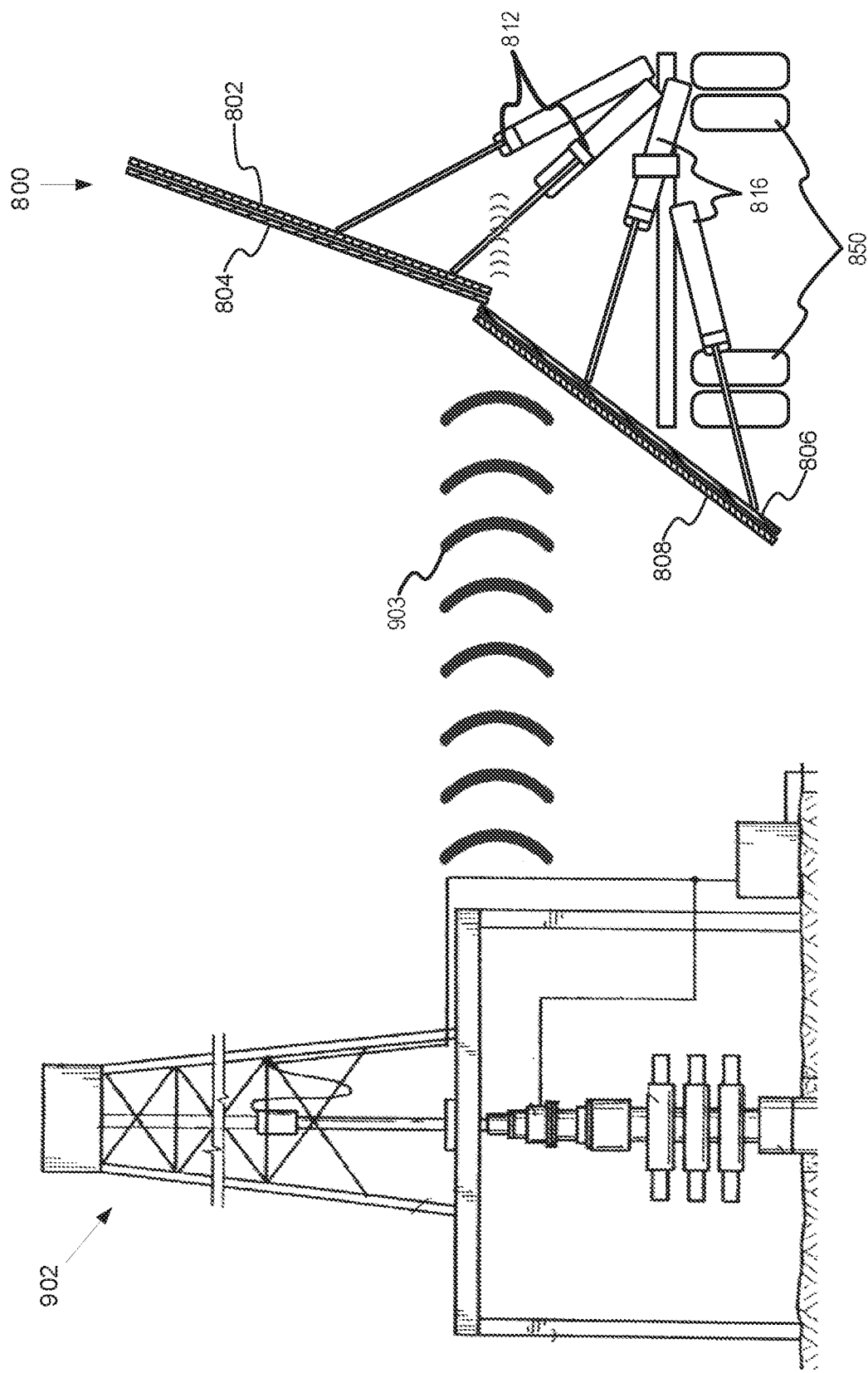
FIG. 9 depicts the trailer in FIG. 8 from a side view and positioned near a drilling operation, according to some embodiments.

Embodiments for noise reduction based on piezoelectric tiles can be used in a number of different applications. For instance, some embodiments can be used to reduce noise from downhole drilling operations for hydrocarbon production (e.g., pump operations, stimulation operations, cementing operations, etc.), jet testing laboratories, airport facilities, highways, etc. FIGS. 8-9, which are now described, depict an example for noise reduction usable in applications to reduce downhole drilling operations.

FIG. 8 depicts a rear view of acoustic-reduction walls attached to a trailer, according to some embodiments. In this example, a trailer 800 can be moved along a set of trailer wheels 850. The trailer 800 can act as a mobile platform and includes an upper set of wall-supporting arms 812, a lower set of wall-supporting arms 816, and a horizontal arm 820. An upper-left acoustic-reduction wall 802 attaches to the upper set of wall-supporting arms 812. A lower-left acoustic-reduction wall 806 is below the upper-left acoustic-reduction wall 802 and attaches to the lower set of wall-supporting arms 816. An upper-right acoustic-reduction wall 804 is to the right of the upper-left acoustic-reduction wall 802 and attaches to the upper-left acoustic-reduction wall 802. A lower-right acoustic-reduction wall 808 is below the upper-left acoustic-reduction wall 802 and to the right of the lower-left acoustic-reduction wall 806. The lower-right acoustic-reduction wall 808 attaches to the horizontal arm 820. Each of the walls 802-808 are positioned such that they can form a closed surface and can be secured to their respective wall-supporting arms through mechanical means such as hinges, bolts, screws, or rings. The walls 802-808 can include different tiles having different subtiles (as described above). For example, the walls 802-808 can be any combination of the tiles depicted in FIGS. 1-6 (described above).

FIG. 9 depicts the trailer in FIG. 8 from a side view and positioned near a drilling operation, according to some embodiments. As shown, a primary acoustic wave source includes a drilling rig 902 that emits primary acoustic waves 903. The acoustic-reduction walls 802-808 can be tilted upwards by the wall-supporting arms 812 and 816 to reflect a portion of the primary acoustic waves 903 upward. Other portions of the primary acoustic waves 903 are not reflected upwards and are difficult to dampen using traditional passive noise-dampening materials. Trailers similar to the trailer 800 can be moved along wheels similar to the set of trailer wheels 850. The trailers can be positioned in a circumferential fashion to form a substantially enclosed region around the drilling operation, thereby reducing the acoustic volume beyond the perimeter of the enclosed region. In some embodiments, each of the walls 802-808 can include both acoustic-capture tiles and acoustic-generator tiles. Alternatively, or in addition, a separate trailer can be positioned behind the trailer 800 relative to the acoustic waves 903. The acoustic-capture tiles can convert the primary acoustic wave 903 into an electric current, transmit the electric current through circuitry that shifts the phase of the electric current, power the acoustic-generator tiles with the phase-shifted current, and generate a phase-shifted acoustic wave that can attenuate the primary acoustic waves 903.

For example, with reference to FIG. 2, if the upper-left acoustic-reduction wall 802 includes the system 200, the primary acoustic waves 240 with a frequency near a resonance frequency of the acoustic-capture subtiles 102 and 104 can be captured by the acoustic-capture subtiles 102 and 104. The electric currents produced by the acoustic-capture subtiles 102 and 104 can be phase-shifted by half a period into phase-shifted electric currents, wherein the period is the period of the electric current. The phase-shifted current can he supplied to the acoustic-generator subtile 202 to produce a phase-shifted acoustic wave. This phase-shifted acoustic wave can have the same frequency as the primary acoustic wave but be out of phase by half a period of the primary acoustic wave. When exposed to the primary acoustic wave, the phase-shifted acoustic wave can interfere with the primary acoustic wave. This interference can reduce the amplitude of the primary acoustic wave.

Example Embodiments

Example embodiments include the following.

Embodiment 1: An apparatus comprising a circuitry; and an acoustic-capture tile having a surface that is to face an acoustic source that is to emit a first acoustic wave having a first frequency and a second acoustic wave having a second frequency, the acoustic-capture tile comprising, a first acoustic-capture subtile electrically coupled to the circuitry, the first acoustic-capture subtile to resonate at the first frequency, wherein the first acoustic-capture subtile is to capture the first acoustic wave and to convert the first acoustic wave into a first electric current in response to resonance at the first frequency; and a second acoustic-capture subtile electrically coupled to the circuitry, the second acoustic-capture subtile to resonate at the second frequency, wherein the second acoustic-capture subtile is to capture the second acoustic wave and to convert the second acoustic wave into a second electric current in response to resonance at the second frequency.

Embodiment 2: an apparatus of any of the above embodiments, wherein the first electric current is to have a first period and the second electric current is to have a second period, wherein the circuitry comprises a first phase-shifter to phase-shift the first electric current by one half of the first period to generate a first phase-shifted electric current; and a second phase-shifter to phase-shift the second electric current by one half of the second period to generate a second phase-shifted electric current.

Embodiment 3: an apparatus of any of the above embodiments, further comprising a first acoustic-generator subtile electrically coupled to the circuitry, the first acoustic-generator subtile to reduce an amplitude of the first acoustic wave based on the first phase-shifted electric current; and a second acoustic-generator subtile electrically coupled to the circuitry, the second acoustic-generator subtile to reduce an amplitude of the second acoustic wave based on the second phase-shifted electric current.

Embodiment 4: an apparatus of any of the above embodiments, wherein the first acoustic-generator subtile is to reduce the amplitude of the first acoustic wave based on generation of a third acoustic wave at the first frequency using the first phase-shifted electric current, and wherein the second acoustic-generator subtile is to reduce the amplitude of the second acoustic wave based on generation of a fourth acoustic wave at the second frequency using the second phase-shifted electric current Embodiment 5: an apparatus of any of the above embodiments, wherein the circuitry comprises an amplifier to amplify an amplitude of the first phase-shifted electric current and an amplitude of the second phase-shifted electric current prior to being used to generate the third acoustic wave and the fourth acoustic wave.

Embodiment 6: an apparatus of any of the above embodiments, wherein the first acoustic-generator subtile is comprised of a first piezoelectric material to resonate at the first frequency, and wherein the second acoustic-generator subtile is comprised of a second piezoelectric material to resonate at the second frequency.

Embodiment 7: an apparatus of any of the above embodiments, wherein a shape of the first acoustic-generator subtile and a shape of the first acoustic-capture subtile are the same, and a shape of the second acoustic-generator subtile and a shape of the second acoustic-capture subtile are the same.

Embodiment 8: an apparatus of any of the above embodiments, wherein a two-dimensional profile of the first acoustic-capture subtile is at least one of a rectangle, triangle, and ellipsoid.

Embodiment 9: an apparatus of any of the above embodiments, wherein the first acoustic-capture subtile is comprised of at least one of piezoelectric ceramic material, piezoelectric polymer, and piezoelectric coating, and wherein the second acoustic-capture subtile is comprised of at least one of piezoelectric ceramic material, piezoelectric polymer, and piezoelectric coating.

Embodiment 10: A method comprising capturing, using a first acoustic-capture subtile, a first acoustic wave having a first frequency, wherein the first acoustic-capture subtile resonates at the first frequency; converting the first acoustic wave into a first electric current with the first acoustic-capture subtile in response to resonance at the first frequency; capturing, using a second acoustic-capture subtile, a second acoustic wave having a second frequency, wherein the second acoustic-capture subtile resonates at the second frequency; and converting the second acoustic wave into a second electric current with the second acoustic-capture subtile in response to resonance at the first frequency.

Embodiment 11: a method of any of the above embodiments, wherein the first acoustic wave is to have a first period and the second acoustic wave is to have a second period, wherein the method further comprises: phase-shifting the first electric current by one half of the first period to generate a first phase-shifted electric current with a circuitry; and phase-shifting the second electric current by one half of the second period to generate a second phase-shifted electric current with the circuitry Embodiment 12: a method of any of the above embodiments, further comprising reducing an amplitude of the first acoustic wave based on the first phase-shifted electric current; and reducing an amplitude of the second acoustic wave based on the second phase-shifted electric current.

Embodiment 13: a method of any of the above embodiments, wherein reducing an amplitude of the first acoustic wave comprises generating, using a first acoustic-generator subtile, a third acoustic wave at the first frequency based on the first phase-shifted electric current with; and wherein reducing an amplitude of the second acoustic wave comprises generating, using a second acoustic-generator subtile, a fourth acoustic wave at the second frequency based on the second phase-shifted electric current.

Embodiment 14: a method of any of the above embodiments, further comprising amplifying an amplitude of the first phase-shifted electric current prior to generating the third acoustic wave; and amplifying an amplitude of the second phase-shifted electric current prior to generating the fourth acoustic wave.

Embodiment 15: a method of any of the above embodiments, wherein the first acoustic-generator subtile is comprised of a first piezoelectric material to resonate at the first frequency, and wherein the second acoustic-generator subtile is comprised of a second piezoelectric material to resonate at the second frequency.

Embodiment 16: A system comprising a wall having a surface that is to face an acoustic source that is to emit a first acoustic wave having a first frequency and a second acoustic wave having a second frequency, the wall comprising, a first acoustic-capture subtile to resonate at the first frequency, wherein the first acoustic-capture subtile to capture the first acoustic wave and to convert the first acoustic wave into a first electric current having a first period, in response to resonance at the first frequency; and a second acoustic-capture subtile to resonate at the second frequency, the second acoustic-capture subtile to capture the second acoustic wave and to convert the second acoustic wave into a second electric current having a second period, in response to resonance at the second frequency; a circuitry electrically coupled to the first acoustic-capture subtile and the second acoustic-capture subtile, wherein the circuitry comprises, a first phase-shifter to phase-shift the first electric current by one half of the first period to generate a first phase-shifted electric current; and a second phase-shifter to phase-shift the second electric current by one half of the second period to generate a second phase-shifted electric current; a first acoustic-generator subtile electrically coupled to the circuitry, the first acoustic-generator subtile to generate a third acoustic wave at the first frequency based on the first phase-shifted electric current; and a second acoustic-generator subtile electrically coupled to the circuitry, the second acoustic-generator subtile to generate a fourth acoustic wave at the second frequency based on the second phase-shifted electric current.

Embodiment 17: a system of any of the above embodiments, wherein the circuitry comprises: an amplifier to amplify an amplitude of the first phase-shifted electric current and an amplitude of the second phase-shifted electric current prior to being used to generate the third acoustic wave and the fourth acoustic wave.

Embodiment 18: a system of any of the above embodiments, wherein the first acoustic-generator subtile is comprised of a first piezoelectric material to resonate at the first frequency, and wherein the second acoustic-generator subtile is comprised of a second piezoelectric material to resonate at the second frequency.

Embodiment 19: a system of any of the above embodiments, wherein the first acoustic-generator subtile is to generate the third acoustic wave at the first frequency based, at least in part, on a shape of the first acoustic-generator subtile.

Embodiment 20: a system of any of the above embodiments, wherein a two-dimensional profile of the first acoustic-capture subtile is at least one of a rectangle, triangle, and Plural instances can be provided for components, operations or structures described herein as a single instance. Boundaries between various components are somewhat arbitrary unless explicitly stated to form a continuous surface, and particular operations are illustrated in the context of specific illustrative configurations. Other allocations of functionality are envisioned and can fall within the scope of the disclosure. In general, structures and functionality presented as separate components in the example configurations can be implemented as a combined structure or component. Similarly, structures and functionality presented as a single component can be implemented as separate components. These and other variations, modifications, additions, and improvements can fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Unless otherwise specified, any use of any form of the terms "connect," "engage," "couple," "attach," or any other term describing an interaction between elements is not meant to limit the interaction to direct interaction between the elements and can also include indirect interaction between the elements described. The various characteristics mentioned above, as well as other features and characteristics described in more detail above, will be readily apparent to those skilled in the art with the aid of this disclosure upon reading the following detailed description of the embodiments, and by referring to the accompanying drawings.

What is claimed is:

1. An apparatus comprising:
an acoustic-capture tile having a surface that is to face an acoustic source that is to emit a first acoustic wave having a first frequency and a second acoustic wave having a second frequency, the acoustic-capture tile comprising,
a first acoustic-capture subtile electrically coupled to circuitry, the first acoustic-capture subtile to resonate at the first frequency, wherein the first acoustic-capture subtile is to capture the first acoustic wave and to convert the first acoustic wave into a first electric current having a first period in response to resonance at the first frequency;
a second acoustic-capture subtile electrically coupled to the circuitry, the second acoustic-capture subtile to resonate at the second frequency, wherein the second acoustic-capture subtile is to capture the second acoustic wave and to convert the second acoustic wave into a second electric current having a second period in response to resonance at the second frequency; and
the circuitry comprising,
a first phase-shifter to phase-shift the first electric current by one half of the first period to generate a first phase-shifted electric current, and
a second phase-shifter to phase-shift the second electric current by one half of the second period to generate a second phase-shifted electric current.

2. The apparatus of claim 1, further comprising:
a first acoustic-generator subtile electrically coupled to the circuitry, the first acoustic-generator subtile to reduce an amplitude of the first acoustic wave based on the first phase-shifted electric current; and
a second acoustic-generator subtile electrically coupled to the circuitry, the second acoustic-generator subtile to reduce an amplitude of the second acoustic wave based on the second phase-shifted electric current.

3. The apparatus of claim 2,
wherein the first acoustic-generator subtile is to reduce the amplitude of the first acoustic wave based on generation of a third acoustic wave at the first frequency using the first phase-shifted electric current, and
wherein the second acoustic-generator subtile is to reduce the amplitude of the second acoustic wave based on generation of a fourth acoustic wave at the second frequency using the second phase-shifted electric current.

4. The apparatus of claim 3, wherein the circuitry comprises:
an amplifier to amplify an amplitude of the first phase-shifted electric current and an amplitude of the second phase-shifted electric current prior to being used to generate the third acoustic wave and the fourth acoustic wave.

5. The apparatus of claim 3, wherein the first acoustic-generator subtile is comprised of a first piezoelectric material to resonate at the first frequency, and wherein the second acoustic-generator subtile is comprised of a second piezoelectric material to resonate at the second frequency.

6. The apparatus of claim 3, wherein a shape of the first acoustic-generator subtile and a shape of the first acoustic-capture subtile are the same, and a shape of the second acoustic-generator subtile and a shape of the second acoustic-capture subtile are the same.

7. The apparatus of claim 1, wherein a two-dimensional profile of the first acoustic-capture subtile is at least one of a rectangle, triangle, and ellipsoid.

8. The apparatus of claim 1, wherein the first acoustic-capture subtile is comprised of at least one of piezoelectric ceramic material, piezoelectric polymer, and piezoelectric coating, and wherein the second acoustic-capture subtile is comprised of at least one of piezoelectric ceramic material, piezoelectric polymer, and piezoelectric coating.

9. A method comprising:
capturing, using a first acoustic-capture subtile, a first acoustic wave having a first frequency and a first period, wherein the first acoustic-capture subtile resonates at the first frequency;
converting the first acoustic wave into a first electric current with the first acoustic-capture subtile in response to resonance at the first frequency;
capturing, using a second acoustic-capture subtile, a second acoustic wave having a second frequency and second period, wherein the second acoustic-capture subtile resonates at the second frequency;
converting the second acoustic wave into a second electric current with the second acoustic-capture subtile in response to resonance at the first frequency;
phase-shifting the first electric current by one half of the first period to generate a first phase-shifted electric current with a circuitry; and
phase-shifting the second electric current by one half of the second period to generate a second phase-shifted electric current with the circuitry.

10. The method of claim 9, further comprising:
reducing an amplitude of the first acoustic wave based on the first phase-shifted electric current; and
reducing an amplitude of the second acoustic wave based on the second phase-shifted electric current.

11. The method of claim 10,
wherein reducing an amplitude of the first acoustic wave comprises generating, using a first acoustic-generator subtile, a third acoustic wave at the first frequency based on the first phase-shifted electric current with; and
wherein reducing an amplitude of the second acoustic wave comprises generating, using a second acoustic-generator subtile, a fourth acoustic wave at the second frequency based on the second phase-shifted electric current.

12. The method of claim 11, further comprising:
amplifying an amplitude of the first phase-shifted electric current prior to generating the third acoustic wave; and
amplifying an amplitude of the second phase-shifted electric current prior to generating the fourth acoustic wave.

13. The method of claim 11, wherein the first acoustic-generator subtile is comprised of a first piezoelectric material to resonate at the first frequency, and wherein the second acoustic-generator subtile is comprised of a second piezoelectric material to resonate at the second frequency.

14. A system comprising:
a wall having a surface that is to face an acoustic source that is to emit a first acoustic wave having a first frequency and a second acoustic wave having a second frequency, the wall comprising, a first acoustic-capture subtile to resonate at the first frequency, wherein the first acoustic-capture subtile to capture the first acoustic wave and to convert the first acoustic wave into a first electric current having a first period, in response to resonance at the first frequency; and a second acoustic-capture subtile to resonate at the second frequency, the second acoustic-capture subtile to capture the second acoustic wave and to convert the second acoustic wave into a second electric current having a second period, in response to resonance at the second frequency;

a circuitry electrically coupled to the first acoustic-capture subtile and the second acoustic-capture subtile, wherein the circuitry comprises, a first phase-shifter to phase-shift the first electric current by one half of the first period to generate a first phase-shifted electric current; and a second phase-shifter to phase-shift the second electric current by one half of the second period to generate a second phase-shifted electric current;

a first acoustic-generator subtile electrically coupled to the circuitry, the first acoustic-generator subtile to generate a third acoustic wave at the first frequency based on the first phase-shifted electric current; and a second acoustic-generator subtile electrically coupled to the circuitry, the second acoustic-generator subtile to generate a fourth acoustic wave at the second frequency based on the second phase-shifted electric current.

15. The system of claim 14, wherein the circuitry comprises:

an amplifier to amplify an amplitude of the first phase-shifted electric current and an amplitude of the second phase-shifted electric current prior to being used to generate the third acoustic wave and the fourth acoustic wave.

16. The system of claim 14, wherein the first acoustic-generator subtile is comprised of a first piezoelectric material to resonate at the first frequency, and wherein the second acoustic-generator subtile is comprised of a second piezoelectric material to resonate at the second frequency.

17. The system of claim 14, wherein the first acoustic-generator subtile is to generate the third acoustic wave at the first frequency based, at least in part, on a shape of the first acoustic-generator subtile.

18. The system of claim 14, wherein a two-dimensional profile of the first acoustic-capture subtile is at least one of a rectangle, triangle, and ellipsoid.

* * * * *